US011848613B1

(12) United States Patent
Gaddam et al.

(10) Patent No.: US 11,848,613 B1
(45) Date of Patent: Dec. 19, 2023

(54) AUTOMATIC CHARGE BALANCING BETWEEN PHASES USING VOLTAGE CONTROL LOOP IN MULTIPHASE CONVERTER

(71) Applicant: Empower Semiconductor, Inc., Milpitas, CA (US)

(72) Inventors: Narendra Nath Gaddam, Milpitas, CA (US); Trey Roessig, Palo Alto, CA (US)

(73) Assignee: Empower Semiconductor, Inc., San Jose, CA (US)

( * ) Notice: Subject to any disclaimer, the term of this patent is extended or adjusted under 35 U.S.C. 154(b) by 57 days.

(21) Appl. No.: 17/410,612

(22) Filed: Aug. 24, 2021

Related U.S. Application Data

(60) Provisional application No. 63/084,114, filed on Sep. 28, 2020.

(51) Int. Cl.
*H02M 3/158* (2006.01)
*H02J 1/10* (2006.01)

(52) U.S. Cl.
CPC ........... *H02M 3/1584* (2013.01); *H02J 1/102* (2013.01)

(58) Field of Classification Search
CPC .. H02M 1/0043; H02M 3/158; H02M 3/1582; H02M 3/1584; H02M 3/1586; H02J 1/102; H02J 1/106
See application file for complete search history.

(56) References Cited

U.S. PATENT DOCUMENTS

| 5,521,809 | A | * | 5/1996 | Ashley | H02J 1/102 |
| | | | | | 323/225 |
| 6,137,274 | A | * | 10/2000 | Rajagopalan | H02J 1/102 |
| | | | | | 323/272 |
| 2015/0263614 | A1 | * | 9/2015 | Bansal | H02M 3/1584 |
| | | | | | 323/282 |
| 2017/0207723 | A1 | * | 7/2017 | Zhang | H02M 1/12 |
| 2017/0302174 | A1 | * | 10/2017 | Yan | H02M 1/12 |
| 2018/0337599 | A1 | * | 11/2018 | Chen | H02M 3/158 |

(Continued)

OTHER PUBLICATIONS

W. Huang, "A new control for multi-phase buck converter with fast transient response," APEC 2001. Sixteenth Annual IEEE Applied Power Electronics Conference and Exposition (Cat. No. 01CH37181), 2001, pp. 273-279 vol. 1, doi: 10.1109/APEC.2001.911660. (Year: 2001).*

(Continued)

*Primary Examiner* — Fred E Finch, III
(74) *Attorney, Agent, or Firm* — Kilpatrick Townsend & Stockton LLP

(57) ABSTRACT

A multiphase switching converter includes: a plurality of phases, an output capacitor, and a control loop. Each phase includes: a current detection device, a pulse width modulator, a set of switching devices, and an inductor. The control loop is configured to generate a first current signal to the current detection device of each phase of the plurality of phases. The first current signal is proportional to an average current generated by the plurality of phases. The current detection device of each phase provides a signal to a corresponding PWM to control a duty cycle of the set of switching devices to equalize the current generated by each phase and maintain a charge balance on the output capacitor.

20 Claims, 5 Drawing Sheets

(56) References Cited

U.S. PATENT DOCUMENTS

2019/0149047 A1* 5/2019 Gurlahosur ......... H02M 3/1584
　　　　　　　　　　　　　　　　　　　　　　323/344
2019/0181746 A1* 6/2019 Chen .................... H02M 3/156
2021/0367519 A1* 11/2021 Talari ................. H02M 1/0009

OTHER PUBLICATIONS

X. Ramus, "Demystifying the operational transconductance amplifier," Texas Instruments application report SBOA117A, Apr. 2013. (Year: 2013).*

Y.- S. Roh et al., "A Multiphase Synchronous Buck Converter With a Fully Integrated Current Balancing Scheme," in IEEE Transactions on Power Electronics, vol. 30, No. 9, pp. 5159-5169, Sep. 2015, doi: 10.1109/TPEL.2014.2368130. (Year: 2015).*

* cited by examiner

AUTOMATIC CHARGE BALANCING BETWEEN PHASES USING VOLTAGE CONTROL LOOP IN MULTIPHASE CONVERTER

CROSS-REFERENCE TO RELATED APPLICATION

This application claims the benefit of U.S. Provisional Application No. 63/084,114 filed Sep. 28, 2020, the content of which is hereby incorporated herein by reference in its entirety.

BACKGROUND

Unless otherwise indicated herein, the materials described in this section are not prior art to the claims in this application and are not admitted to be prior art by inclusion in this section.

A DC-DC switching converter to converts electrical power from a DC source to DC loads, such as a processor, while converting voltage and current characteristics. A multiphase switching converter includes a parallel set of power stages. The power stages include inductors as well as pulse width modulators that control switching devices to convert the input voltage and current to output voltage and current. Conventional switching converters, such as multiphase buck converters, utilize a closed loop current sense circuit and averaging methods to balance the charge on the output capacitor provided by the different the phases of the converter. Switching converters operating at higher frequencies can have difficulty sensing current using a current sense amplifier in the control loop. The current sense amplifier may limit the switching frequency of the converter due to the limitations in the operating speed of the closed loop current sense circuit as well as power consumption requirements.

SUMMARY

Aspects of the present disclosure relate to switching converters, and more particularly, though not necessarily exclusively to, multiphase DC-DC switching converters.

According to various aspects there is provided a multiphase switching converter. In some aspects, the multiphase switching converter may include: a plurality of phases, an output capacitor, and a control loop. Each phase may include: a current detection device, a pulse width modulator, a set of switching devices, and an inductor. The control loop may be configured to generate a first current signal to the current detection device of each phase of the plurality of phases. The first current signal may be proportional to an average current generated by the plurality of phases. The current detection device of each phase may provide a signal to a corresponding PWM to control a duty cycle of the set of switching devices to equalize the current generated by each phase and maintain a charge balance on the output capacitor.

According to various aspects there is provided a control loop for a multiphase switching converter. In some aspects, the control loop may include: a feedback circuit configured to generate a feedback voltage proportional to an output voltage of the multiphase switching converter; a first amplifier configured to generate an error voltage based on a comparison of the feedback voltage and a reference voltage; a second amplifier configured to convert the error voltage to a first current and distribute the first current to each phase of the multiphase switching converter. Each phase of the multiphase switching converter may control an output current based on a comparison of the first current and a second current.

According to various aspects there is provided a method for providing charge balancing in a multiphase switching converter. In some aspects, the method may include: sensing an output voltage of the multiphase switching converter having a plurality of phases; generating a feedback voltage proportional to the output voltage; generating an error voltage by comparing the feedback voltage with a reference voltage; converting the error voltage to an error current; distributing the error current to each phase of the multiphase switching converter; and controlling a current generated by each phase of the multiphase switching converter based on the error current to maintain a charge balance on an output capacitor of the multiphase switching converter.

BRIEF DESCRIPTION OF THE DRAWINGS

Various embodiments in accordance with the present disclosure will be described with reference to the drawings, in which.

DETAILED DESCRIPTION

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1:
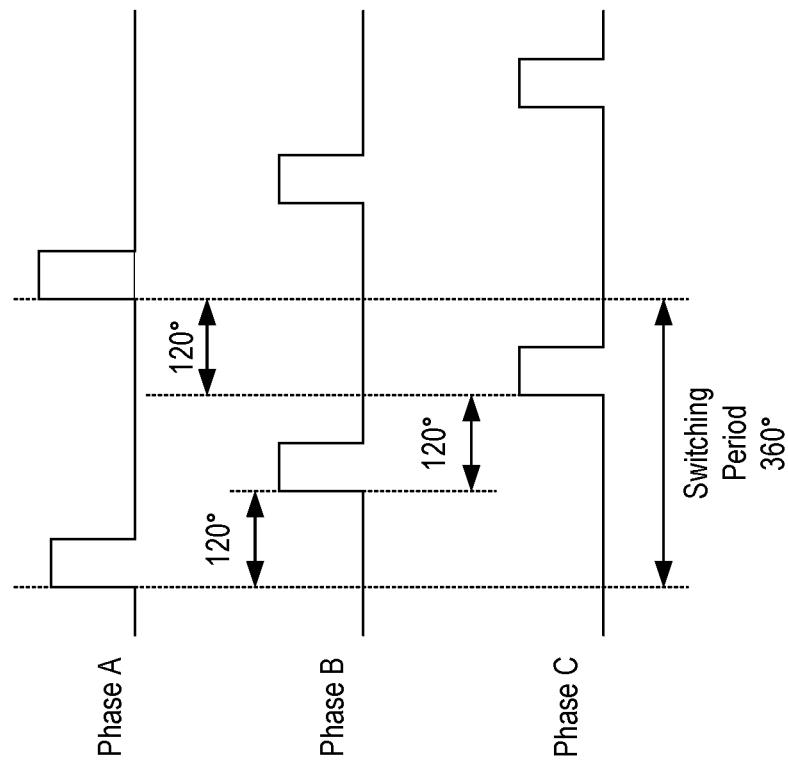
FIG. 1 is a block diagram illustrating an example of a multiphase switching converter having three phases, and the corresponding active portions of the switching period for each phase according to some aspects of the present disclosure.
Figure 1:
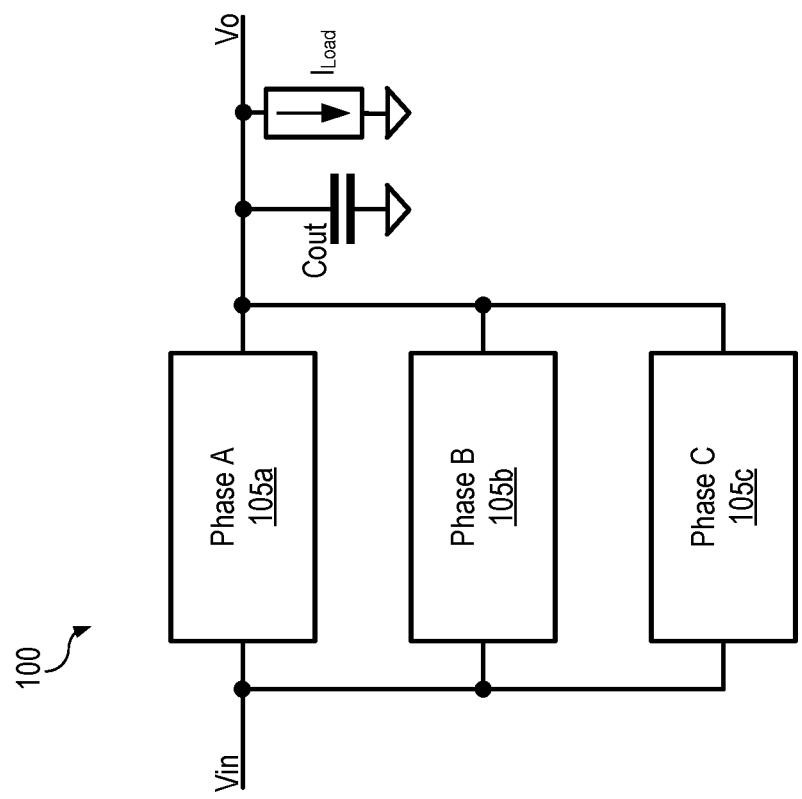

A multiphase switching converter includes a parallel set of power stages, each with its own inductor and set of power transistors, for example, metal-oxide semiconductor field effect transistors (MOSFETs) or bipolar transistors. Collectively, these components are referred to as a phase. The phases in a multiphase switching converter are connected in parallel and share an output capacitor that stores charge. At least some of the charge stored on the output capacitor is subsequently delivered to the load as load current. During steady state operation, individual phases are active at spaced intervals equal to 360°/n throughout the switching period, where n is the total number of phases. FIG. 1 is a block diagram illustrating an example of a multiphase switching converter 100 having three phases (e.g., power stages), and the corresponding active portions of the switching period for each phase according to some aspects of the present disclosure. As illustrated in FIG. 1, each of the three phases 105a-105c is active at some portion of an interval of 360°/3=120° over the switching period.

During each cycle of a switching converter, an equal amount of charge should be delivered to and provided from an output capacitor. The amount of charge may be measured by the current that charges and discharges the output capacitor. In a steady state, the average capacitor current should be zero, and therefore the charge should be balanced. Each phase of the multiphase switching converter should provide a portion of the load current, and accordingly, a portion of the charge on the output capacitor.

Variations in component parameters, for example, MOSFET drain to source resistance, DC resistance of inductors, etc., as well as parasitic resistances, inductances, and capacitances in the switching converter circuit, can result in different currents being provided by each phase of the multiphase switching converter. For example, referring to FIG. 1, for an average load current $I_{Load}$ of 3.0 amps, Phase A 105a may generate 0.9 amps, Phase B 105b may generate 1.0 amp, and Phase C 105c may generate 1.1 amps due to the component variations and parasitic components. In order to maintain the charge balance on the output capacitor, each of the several phases should contribute equally to the load current, and thereby provide equal amounts of charge to the output capacitor.

Some aspects of the present disclosure can provide systems and methods that can improve charge balancing in a multiphase switching converter using a voltage control loop with lesser complexity and lower power consumption than a conventional control loop that uses one or more current sense amplifiers. Techniques according to the present disclosure may sense the inductor current in open loop mode and with higher speed, higher accuracy, and lower power consumption for the control loop.

Figure 2:
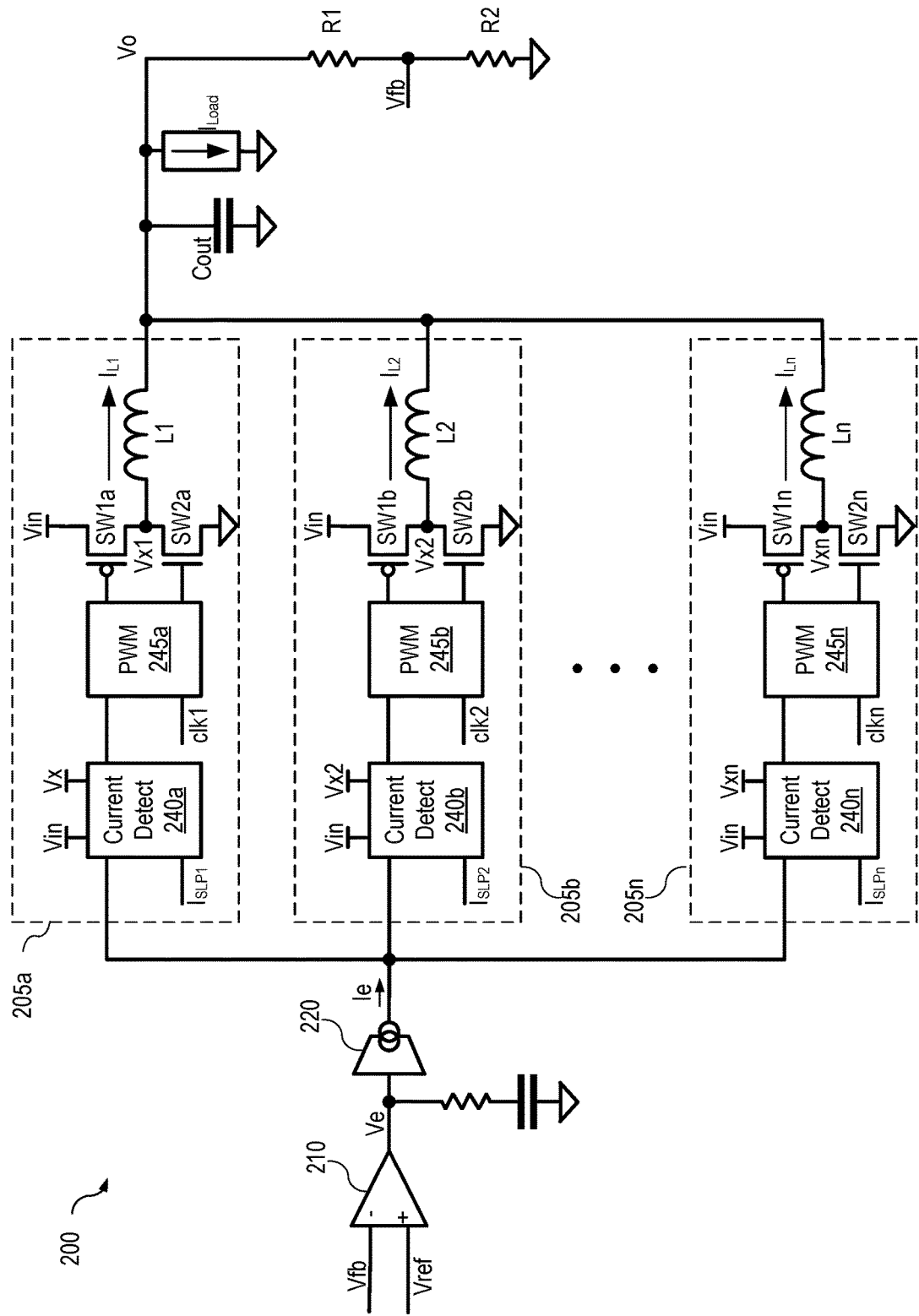
FIG. 2 is a schematic diagram illustrating an example of a multiphase DC-DC synchronous buck converter according to some aspects of the present disclosure.

FIG. 2 is a schematic diagram illustrating an example of a multiphase DC-DC synchronous buck converter 200 according to some aspects of the present disclosure. Each phase of the multiphase synchronous buck converter utilizes switching devices (e.g., MOSFETS or other types of switching devices) to convert a source DC voltage Vin to a different DC voltage Vo at a load. Referring to FIG. 2, a pulse width modulator (PWM) 245a-245n generates signals to turn on and turn off the MOSFETS SW1a-SW1n, SW2a-SW2n according to a duty cycle that defines a time that each MOSFET is turned on. The duty cycle determines an average output voltage Vo for the converter.

During each switching cycle of a buck converter, charge will be delivered to the output capacitor when the switch SW1 is closed and the switch SW2 is open, and charge will be provided to the load as current by the output capacitor when the switch SW1 is open and the switch SW2 is closed. In a steady state, the average amount of charge (or current) delivered to the capacitor and provided by the capacitor should be zero (e.g., the charge will be balanced). With a multiphase converter, each phase 205a-205n should deliver, and the capacitor should provide, the same amount of charge to maintain the charge balance. The duty cycle of the switching devices SW1a-SW1n, SW2a-SW2n may be determined by clock signals clk1-clkn and signals from the current detection devices 240a-240n input to the PWMs 245a-245n.

For each phase 205a-205n of the multiphase DC-DC synchronous buck converter 200, when SW2 is turned off by the PWM and SW1 is turned on by the PWM, current $I_L$ increases in the corresponding inductor L1-Ln through SW1. Some of the current $I_L$ charges the capacitor Cout and some of the current $I_L$ is delivered as load current Load producing an output voltage Vo. When the PWM turns SW1 off and turns SW2 on, the current $I_L$ in the corresponding inductor L1-Ln will be at a peak, and begins to decrease. Load current $I_{Load}$ is delivered from the corresponding inductor L1-Ln and the capacitor Cout through SW2. While one capacitor Cout is illustrated in FIG. 2, Cout may include more than one capacitor.

Control for the multiphase DC-DC synchronous buck converter 200 may be provided by sensing the output voltage Vo and the peak inductor current $I_L$. The output voltage Vo may be sensed by a feedback circuit, for example by a resistive voltage divider circuit R1, R2 or by another method. A feedback voltage Vfb developed by the resistive voltage divider circuit R1, R2 may be compared to a reference voltage Vref by an error amplifier 210 to generate an error voltage Ve. The reference voltage Vref may be determined to set a specified output voltage Vo.

The error voltage Ve generated by the error amplifier 210 may be converted to an error current Ie by an operational transconductance amplifier (OTA) 220. The error current Ie may be proportional to the average peak inductor current. During each switching period, the average peak inductor current may be provided from each individual phase 205a-205n proportional to the load current $I_{Load}$ divided by the number of phases 205a-205n of the multiphase converter 200. The average peak inductor current represented by the error current Ie may be distributed to all the phases 205a-205n of the multiphase converter 200, and combined with a corresponding ramp current signal $I_{SLP1}$-$I_{SLPn}$. For example, the ramp current signal may be added to the error current signal, subtracted from the error current signal, or compared with the error current signal. Other methods of combining the ramp current signal and the error current signal may be performed without departing from the scope of the present disclosure. The ramp current signal $I_{SLP1}$-$I_{SLPn}$ may modify the error current Ie to set a threshold for peak inductor current $I_L$ for each phase 205a-205n. For each phase 205a-205n of the multiphase switching converter 200, the combined Ie and $I_{SLP}$ current signal may be input to a current detection device 240a-240n to provide control of peak inductor current $I_L$ for the multiphase switching converter 200. The current detection device 240a-240n may include for example, the current detection device disclosed in U.S. Provisional Application No. 63/071,771 filed Aug. 28, 2020, entitled High Speed, Low Quiescent Current Comparator, the content of which is incorporated herein by reference in its entirety.

According to aspects of the present disclosure, a current detection device 240a-240n may include a current comparator, and may detect peak current in the inductor L1-Ln to provide a signal to the PWM 245a-245n for controlling the duty cycle of the switching devices (e.g., SW1a-SW1n and SW2a-SW2n in FIG. 2) for each phase 205a-205n. For each phase 205a-205n of the multiphase DC-DC synchronous buck converter 200, a clock signal clk1-clkn to the PWM 245a-245n may cause SW2a-SW2n to be turned off and SW1a-SW1n to be turned on, while a signal from the current detection device 240a-240n to the PWM 245a-245n may cause SW1a-SW1n to be turned off and SW2a-SW2n to be turned on, thereby controlling the duty cycle of the switching devices SW1a-SW1n, SW2a-SW2n.

During each switching period, the current detection device 240a-240n for each phase 205a-205n may compare the combined Ie and $I_{SLP}$ current signals with the peak inductor currents $I_{L1}$-$I_{Ln}$ of each individual phase 205a-205n. Based on the comparison, the current detection device 240a-240n for each phase 205a-205n may generate a signal to the corresponding PWM 245a-245n to modulate the duty cycle of the switching devices SW1, SW2 to regulate the peak inductor current $I_{L1}$-$I_{Ln}$ of each phase 205a-205n. By regulating the peak inductor current, the average current provided by each phase 205a-205n may also be regulated, thereby maintaining the charge balance on the output capacitor Cout.

Figure 3:
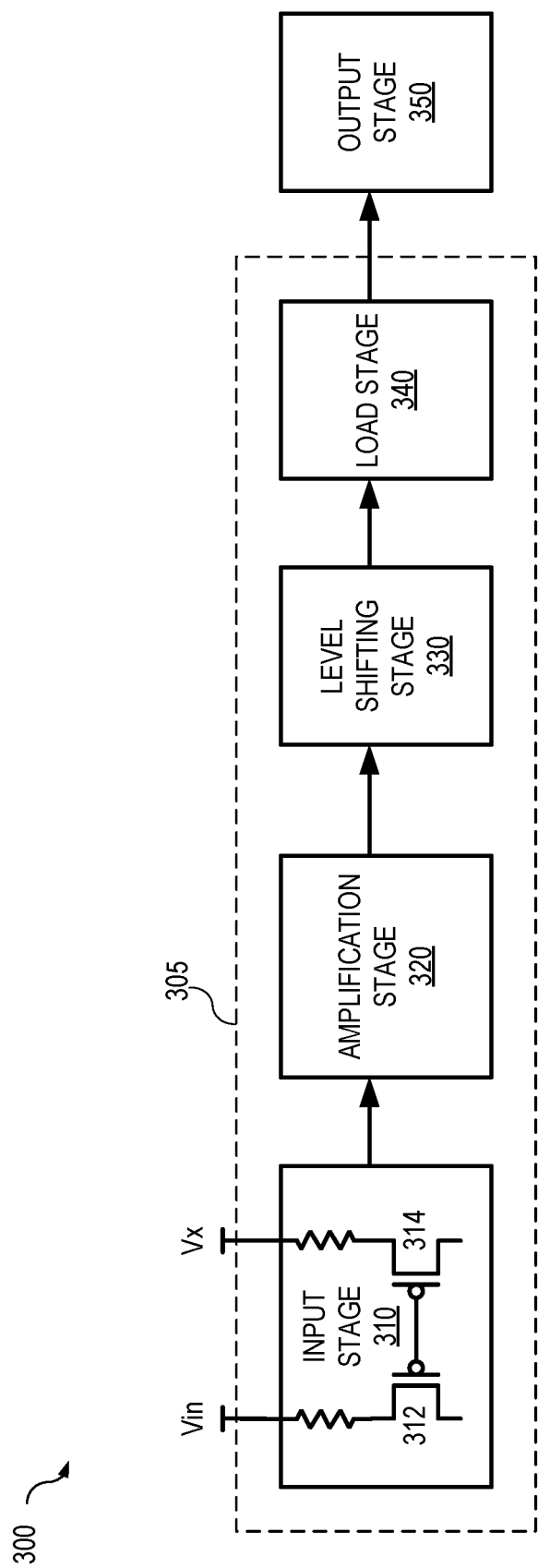
FIG. 3 is a block diagram of an example of a current detection device according to some aspects of the present disclosure.

FIG. 3 is a block diagram of an example of a current detection device 300 according to some aspects of the present disclosure. The current detection devices for each of the phases (e.g., the phases 205a-205n) of the multiphase switching converter (e.g., the multiphase DC-DC synchronous buck converter 200) may operate in a similar manner. The current detection device 300 may be, for example, one of the current detection devices 240a-240n illustrated in FIG. 2. The current detection device 300 may include a current comparator 305 and an output stage 350. The current comparator 305 may include an input stage 310, an amplification stage 320, a level shifting stage 330, and a load stage 340.

Figure 4:
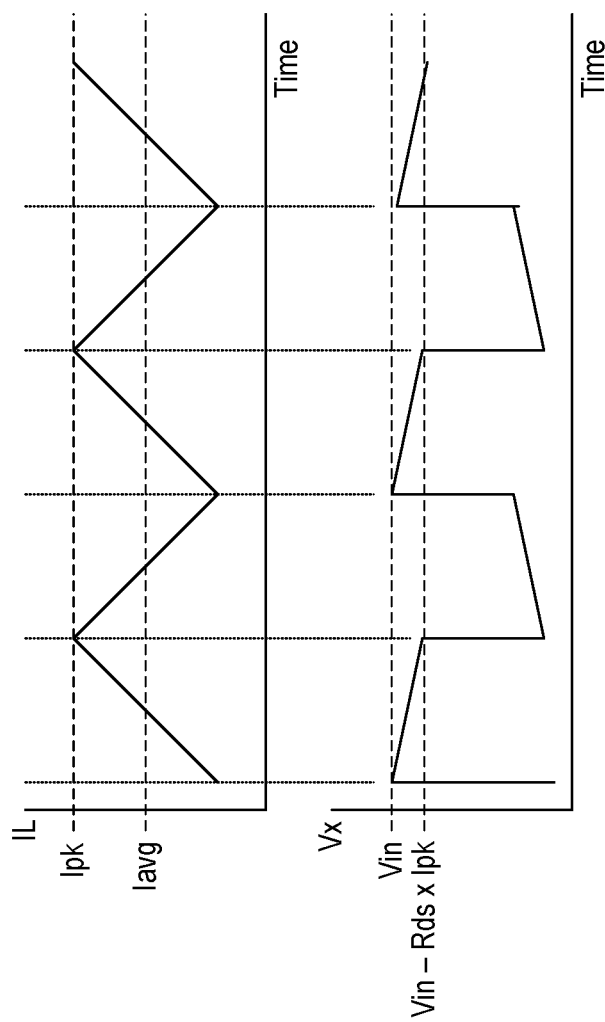
FIG. 4 is a diagram illustrating an example of an inductor current waveform and a Vx voltage waveform according to some aspects of the present disclosure.

With reference to FIG. 2, the input stage 310 may receive the input voltage Vin to the converter and the voltage Vx at the connection point between the switching devices SW1, SW2. When SW1 is turned on by the PWM, the voltage Vx may rise to the input voltage Vin. As the inductor current $L_{L1}$ ramps up to a peak inductor current $I_{pk}$, a voltage drop may be developed across the switching device SW1 caused by the current flowing through a resistance between the source and drain (Rds) of the device SW1. The voltage drop across SW1 may be proportional to the current flowing through SW1, which is also the current flowing in the inductor L1. The current $I_{L1}$ flowing through SW1 may cause the voltage at Vx to drop to a value of $V_{in}-I_{L1} \times R_{ds}$. FIG. 4 is a diagram illustrating an example of an inductor current waveform and a Vx voltage waveform according to some aspects of the present disclosure. As illustrated in FIG. 4, as the inductor current $I_{L1}$ ramps up, the voltage Vx drops proportionally to the inductor current $I_{L1}$.

Returning to FIG. 3, the input stage 310 may include sensing devices, for example, sense MOSFETs, 312, 314, having a resistance parameter, e.g., source-drain resistances (Rds), scaled to the source-drain resistance of the switching device SW1. The voltage Vin may be applied to a first sense MOSFET 312 of the input stage 310, and the voltage Vx may be applied to a second sense MOSFET 314 of the input stage 310. In some implementations the ratio of Rds of the sense MOSFETs 312, 314 in the input stage 310 to Rds of the switching device SW1 may be 10,000. For example, for an Rds of 50 milliohm for the switching device SW1, the Rds of the first and second sense MOSFETs 312, 314 may be 500 a Other ratios may be used without departing from the scope of the present disclosure.

Current flowing through the sense MOSFETs 312, 314 in the input stage 310 based on the input voltages Vin and Vx may be proportional to the current flowing through the switching device SW1, and may cause the input stage 310 to generate a differential voltage proportional to the voltage Vin and the voltage Vx. For example, a one amp current through the switching device SW1 may generate a voltage drop of 1 A×0.05 Ω=50 mV, while only 100 μA would be required to produce a corresponding 50 mV drop (100 μA χ 500Ω) across the first and second sense MOSFETs 312, 314 in the input stage 310. Thus, for each phase of the multiphase switching converter, the peak current in the inductor L1-Ln may be sensed based on the voltage difference between Vin and Vx across the resistance Rds of the switching device SW1.

The amplification stage 320 may amplify the voltages produced by the input stage and generate output currents proportional to the amplified voltages. The combined Ie and $I_{SLP}$ current signal may be applied to the amplification stage 320 to set a threshold value for a peak inductor current that can cause the output voltage of the output stage 350 to change state.

The output stage 350 may change state when the current flowing in the inductor L1-Ln causes the voltage Vx to decrease to a value that causes the value of the current flowing in the second sense MOSFET 314 to fall below the current flowing in the first sense MOSFET 312. The current flowing in the first sense MOSFET 312 may be influenced by the combined Ie and $I_{SLP}$ current signal to set the threshold value for the peak inductor current.

The level shifting stage 330 may provide a voltage level shift between the amplification stage 320 and the load stage 340 to prevent voltage stress on the amplification stage 320. The load stage 340 may compare the currents generated by the amplification stage 320 and generate a differential output voltage. The output stage 350 may generate a single-ended voltage output signal from the differential output voltage generated by the load stage 340. The output stage 350 may increase the gain of the output signal while providing high bandwidth. The output signal may be provided to the PWM to control the duty cycle of the switching devices SW1, SW2.

Thus, output current of each phase of the multiphase switching converter may be regulated based on average peak inductor current to maintain the charge balance on the output capacitor Cout. The average peak inductor current for each phase may be influenced by variations in component parameters, for example, MOSFET drain to source resistance, DC resistance of inductors, etc., as well as parasitic resistances, inductances, and capacitances of the respective phases. For accurate charge balance to be maintained, the inductors L1-Ln should be well matched (e.g., inductance values, series resistance, etc.). The slope currents $I_{SLP1}$-$I_{SLPn}$ provided to the current detection devices 240a-240n and the clocks clk1-clkn provided to the PWMs 245a-245n should also be accurate across the phases, since the clocks and slope currents can determine the duty cycles of the switching devices SW1a-SW1n, SW2a-SW2n. The resistance ratio between the switching device SW1a-SW1n and the sense devices (e.g., sense MOSFETS 312, 314) in the input stages 310 of the current detection devices can balance the output currents of the individual phases, and can provide the charge balance for the output capacitor Cout.

Figure 5:
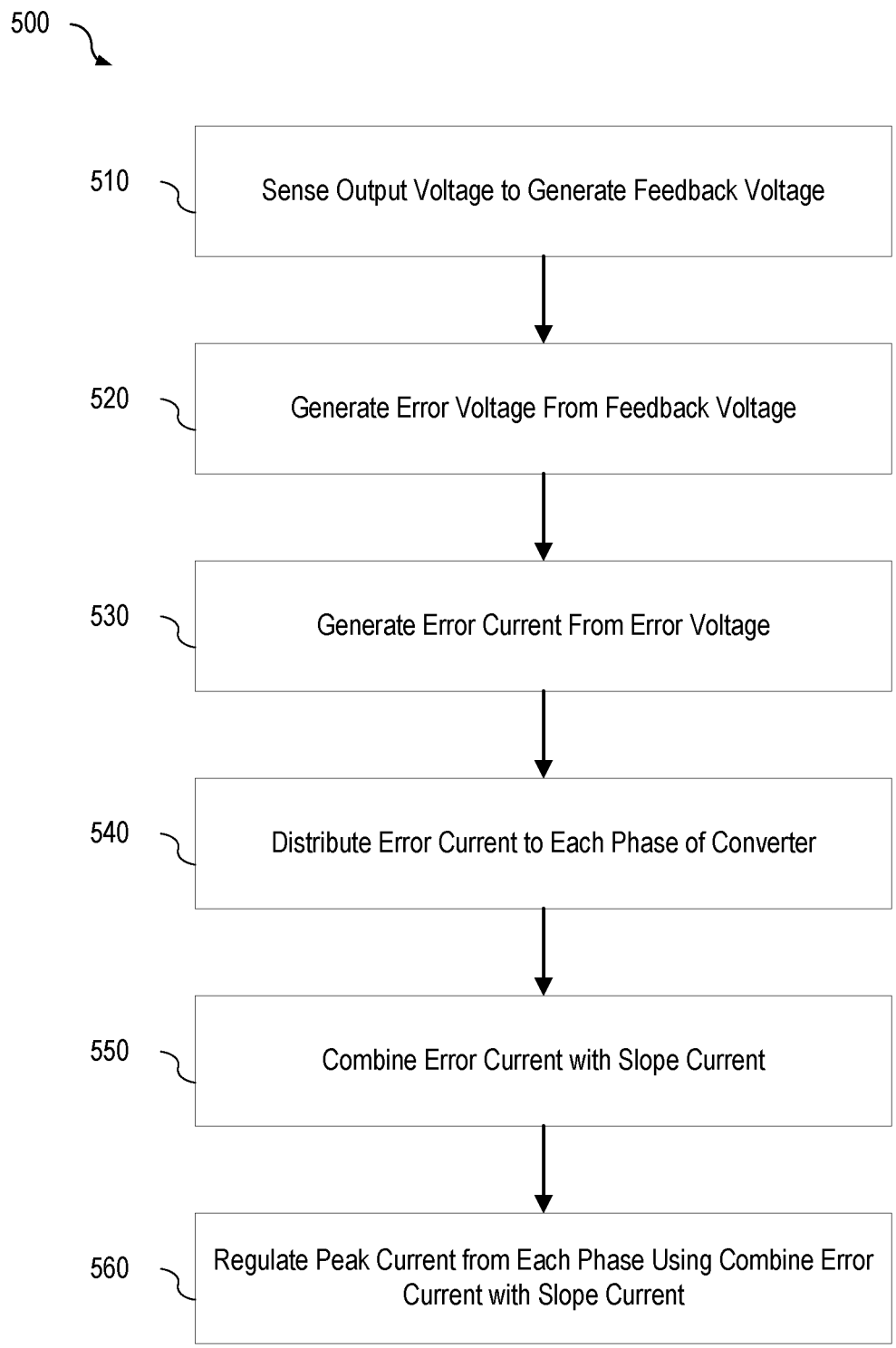
FIG. 5 is a flowchart illustrating an example of a method for providing charge balancing in a multiphase switching converter according to aspects of the present disclosure.

FIG. 5 is a flowchart illustrating an example of a method 500 for providing charge balancing in a multiphase switching converter according to aspects of the present disclosure. Referring to FIG. 5, at block 510, the output voltage of the converter may be sensed to generate a feedback voltage. Control for the switching converter may be provided by sensing the output voltage Vo and the peak inductor current. The output voltage Vo may be sensed, for example by using a voltage divider (e.g., R1, R2 in FIG. 2) or other sensing method to generate a feedback voltage based on the output voltage Vo.

At block 520, an error voltage may be generated from the feedback voltage. The feedback voltage may be compared to a reference voltage by an error amplifier (e.g., the error amplifier 210) to generate the error voltage. The reference voltage may be a value determined to set a specified output voltage Vo.

At block 530, an error current may be generated from the error voltage. The error voltage may be converted to an error current, for example, by an operational transconductance amplifier (OTA) (e.g., the OTA 220). The error current may be proportional to the average peak inductor current. During each switching period, the average peak inductor current may be provided from each individual phase proportional to the load current divided by the number of phases of the multiphase converter.

At block 540, the error current may be distributed to each phase of the multiphase converter. During each switching period, the average peak inductor current represented by the control current may be distributed to current detection devices (e.g., current detection devices 240a-240n) for each phase of the multiphase converter. In some implementations, the full average peak inductor current may be distributed to current detection devices. In some implementations, currents proportional to the average peak inductor current may be distributed to current detection devices.

At block 550, the error current may be combined with a slope current. For each phase of the multiphase switching converter, the combined error and ramp current signal may be input to the current detection device. The ramp current signal may modify the error current to set a threshold value for peak inductor current for each phase to provide peak inductor current control for each phase of the switching converter At block 560, the peak inductor current from each phase may be regulated. For each phase of the multiphase switching converter, a clock signal input to the PWM may cause the switching device SW1 to turn on, causing current to flow from the input voltage source through the inductor to provide current to the output capacitor Cout and the load. When the current detection device senses that the peak inductor current exceeds the threshold value set by the combined Ie and $I_{SLP}$ current signal, current detection device may generate a signal to the PWM to cause the switching device SW1 to turn off, thereby controlling the duty cycle of the switching device SW1 (and switching device SW2). By controlling the duty cycle in this manner, peak inductor current, and therefore, average current, generated by each phase of the multiphase converter may be equalized, thereby maintaining charge balance for the output capacitor Cout.

The specific operations illustrated in FIG. 5 provide a particular method for providing charge balancing in a multiphase switching converter according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 5 may include multiple sub-operations that may be performed in various sequences as appropriate to the individual operation. Furthermore, additional operations may be added or removed depending on the particular applications.

The method 500 may be embodied on a non-transitory computer readable medium, for example, but not limited to, a memory (not shown) or other non-transitory computer readable medium known to those of skill in the art, having stored therein a program including computer executable instructions for making a processor, computer, or other programmable device (not shown) execute the operations of the method.

Aspects of the present disclosure can balance the current between the phases in multiphase switching converter using voltage control loop with less complexity, higher accuracy and lower power consumption. The error current generated from the voltage control loop may be distributed across the phases of the multiphase converter. The error current represents the average peak inductor current generated from each individual phase proportional to the load current divided by the number of phases. In each switching cycle, the current detection device in each phase may compare the average inductor current with the peak inductor current generated by that phase. The duty cycle of the switching devices may be modulated according to a signal provided from the current detection device to the PWM to control the average inductor current by controlling the peak inductor current of that phase.

The control loop for the switching converter may operate without additional current sense amplifiers, and the switching converter may operate without additional charge balancing circuitry. Thus, the technique according to the present disclosure can balance the charge between phases of the multiphase switching converter using voltage control loop with less complexity and lower power compared with a conventional multiphase switching converter.

While aspects of the present disclosure have been illustrated and described with respect to the synchronous multiphase switching buck converter topology, systems and methods according to the present disclosure may be applied to other switching converter topologies without departing from the scope of the present disclosure.

In the foregoing specification, embodiments of the disclosure have been described with reference to numerous specific details that can vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction. The specific details of particular embodiments can be combined in any suitable manner without departing from the spirit and scope of embodiments of the disclosure.

What is claimed is:

1. A multiphase switching converter, comprising:
   a plurality of phases;
   an output capacitor; and
   a control loop,
   wherein each phase includes:
      a current detection device;
      a pulse width modulator (PWM) circuit;
      a set of switching devices; and
      an inductor,
   wherein the control loop is configured to transmit a first current to the current detection device of each phase of the plurality of phases, the first current being proportional to an average current generated by the plurality of phases, and
   wherein the current detection device of each phase provides a signal to a corresponding PWM circuit to control a duty cycle of a set of corresponding switching devices to equalize an output current generated by each phase such that each phase delivers a substantially equal quantity of charge to the output capacitor to maintain a charge balance on the output capacitor.

2. The multiphase switching converter of claim 1, wherein the average current is proportional to an average peak inductor current generated by the plurality of phases.

3. The multiphase switching converter of claim 1, wherein the control loop comprises:

a first amplifier configured generate an error voltage based on a comparison of a reference voltage and a sensed output voltage of the multiphase switching converter; and a second amplifier configured to convert the error voltage to the first current.

4. The multiphase switching converter of claim 3, wherein an output voltage of the multiphase switching converter is sensed by a resistive voltage divider circuit.

5. The multiphase switching converter of claim 1, wherein the current detection device of each phase generates a signal to the corresponding PWM circuit to control a peak inductor current generated by each phase.

6. The multiphase switching converter of claim 5, wherein a threshold value for the peak inductor current is set by the first current combined with a ramp current.

7. The multiphase switching converter of claim 1, wherein the current detection device of each phase comprises:

a first MOSFET configured to receive a first voltage, the first voltage being an input voltage to the multiphase switching converter, and sense a first current generated by the first voltage; and a second MOSFET configured to receive a second voltage, the second voltage being a voltage at a connection between a first switching device of the set of switching devices and a second switching device of the set of switching devices, and sense a second current generated by the second voltage, wherein a difference between the first current and the second current is proportional to an inductor current.

8. The multiphase switching converter claim 7, wherein a resistance parameter of the first MOSFET and a resistance parameter of the second MOSFET are scaled to a resistance parameter of one of the first switching device or the second switching device.

9. A control loop for a multiphase switching converter, the control loop comprising:

a feedback circuit configured to generate a feedback voltage proportional to an output voltage of the multiphase switching converter;

a first amplifier configured to generate an error voltage based on a comparison of the feedback voltage and a reference voltage; and a second amplifier configured to convert the error voltage to a first current and distribute the first current to each phase of the multiphase switching converter, wherein each phase of the multiphase switching converter controls an output current based on a comparison of the first current and a second current to control a duty cycle of a set of switching devices to equalize an output current generated by each phase such that each phase delivers a substantially equal quantity of charge to an output capacitor to maintain a charge balance on the output capacitor.

10. The control loop of claim 9, wherein each phase of the multiphase switching converter comprises a current detection device, wherein the current detection device of each phase is configured to compare the first current and the second current, and based on a comparison result, generate a control signal to control a peak inductor current of a respective phase.

11. The control loop of claim 10, wherein the second current is a ramp current, and a threshold value for the peak inductor current is set by the first current combined with the ramp current.

12. The control loop of claim 10, wherein the current detection device comprises:

a first MOSFET configured to receive an input voltage to the multiphase switching converter, and sense a third current generated by the input voltage; and a second MOSFET configured to receive a second voltage at a connection between a first switching device of a set of switching devices and a second switching device of the set of switching devices, and sense a fourth current generated by the second voltage, wherein a difference between the third current and the fourth current is proportional to an inductor current.

13. The control loop of claim 12, wherein a resistance parameter of the first MOSFET and a resistance parameter of the second MOSFET are scaled to a resistance parameter of one of the first switching device or the second switching device.

14. The control loop of claim 9, wherein the first current is proportional to an average peak inductor current generated by a plurality of phases of the multiphase switching converter.

15. The control loop of claim 9, wherein the feedback circuit is a resistive voltage divider circuit.

16. A method for providing charge balancing in a multiphase switching converter, the method comprising:

sensing an output voltage of the multiphase switching converter having a plurality of phases;

generating a feedback voltage proportional to the output voltage;

generating an error voltage by comparing the feedback voltage with a reference voltage;

converting the error voltage to an error current;

distributing the error current to each phase of the multiphase switching converter; and controlling a current generated by each phase of the multiphase switching converter based on the error current by controlling a duty cycle of each respective set of switching devices in each phase to deliver a substantially equal quantity of charge to a common output capacitor to maintain a charge balance on the common output capacitor.

17. The method of claim 16, wherein the error current is proportional to an average peak inductor current generated by the plurality of phases.

18. The method of claim 16, wherein the controlled current generated by each phase of the multiphase switching converter is a peak inductor current.

19. The method of claim 18, further comprising:

comparing the peak inductor current to a threshold value, wherein the threshold value for the peak inductor current is determined by the error current combined with a ramp current.

20. The method of claim 16, wherein the feedback voltage is generated by a resistive voltage divider circuit.

* * * * *